United States Patent [19] [11] 4,396,338
Applegate et al. [45] Aug. 2, 1983

[54] PACKET RESERVOIR

[75] Inventors: Barry G. Applegate; Desmond W. Molins, both of London, England

[73] Assignee: Molins Limited, London, England

[21] Appl. No.: 164,942

[22] Filed: Jul. 1, 1980

[30] Foreign Application Priority Data

Jul. 5, 1979 [GB] United Kingdom ............... 7923487

[51] Int. Cl.³ .......................................... B65G 67/00
[52] U.S. Cl. .................................... 414/331; 198/347
[58] Field of Search ............... 414/108, 268, 269, 330, 414/331; 312/50, 97, 312; 160/167, 169; 198/347

[56] References Cited

U.S. PATENT DOCUMENTS

| 2,459,524 | 1/1949 | Hanson | 414/331 |
| 3,340,992 | 9/1967 | Seragnoli | 198/24 |
| 3,499,555 | 3/1970 | Wahle | 198/347 |
| 3,637,095 | 1/1972 | Kampfer | 414/331 |
| 3,712,488 | 1/1973 | Steves | 254/122 |
| 3,883,008 | 5/1975 | Castaldi | 414/269 |
| 3,902,773 | 9/1975 | Gondek | 312/97 |
| 4,220,236 | 9/1980 | Blidung et al. | 198/347 |
| 4,230,216 | 10/1980 | Wiens | 198/347 |

FOREIGN PATENT DOCUMENTS 334034 8/1930 United Kingdom .
576601 4/1946 United Kingdom .

Primary Examiner—Trygve M. Blix
Assistant Examiner—Stephen P. Avila
Attorney, Agent, or Firm—Antonelli, Terry & Wands

[57] ABSTRACT

A reservoir, particularly for cigarette packets, stores rectangular arrays of packets on vertically-spaced platforms. The reservoir is filled or emptied by moving successive batches of packets transversely off (or onto) a conveyor on which packets are moved in line, e.g. from a cigarette packing machine to a cigarette wrapping machine. When a platform is completely full it is indexed upwards and another platform moved from a store to take its place. The spacing between adjacent platforms in the empty platform store is less than that between platforms in use for supporting packets; this is achieved by supporting the platforms by tapes, similar to those of a venetian blind.

14 Claims, 7 Drawing Figures

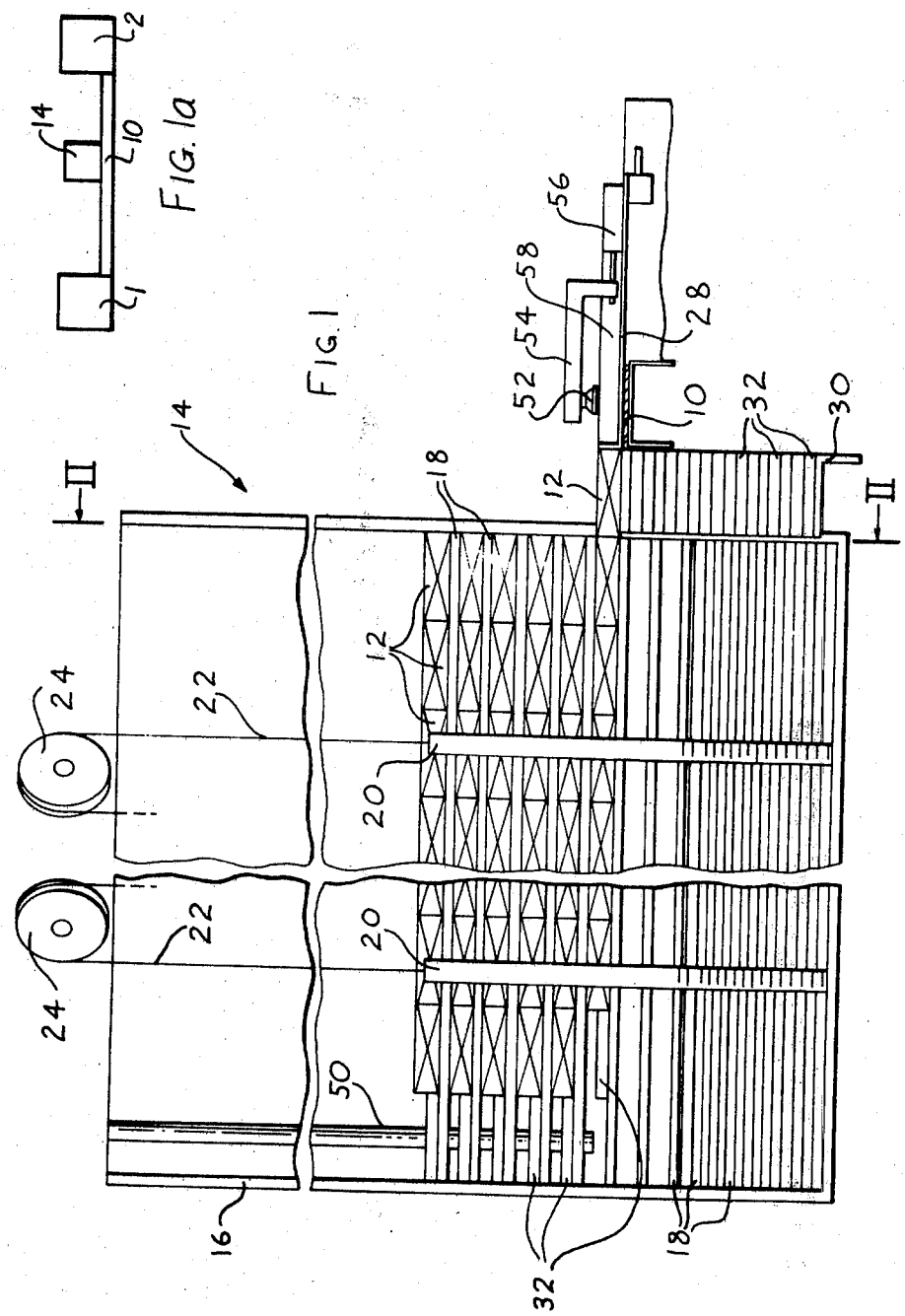

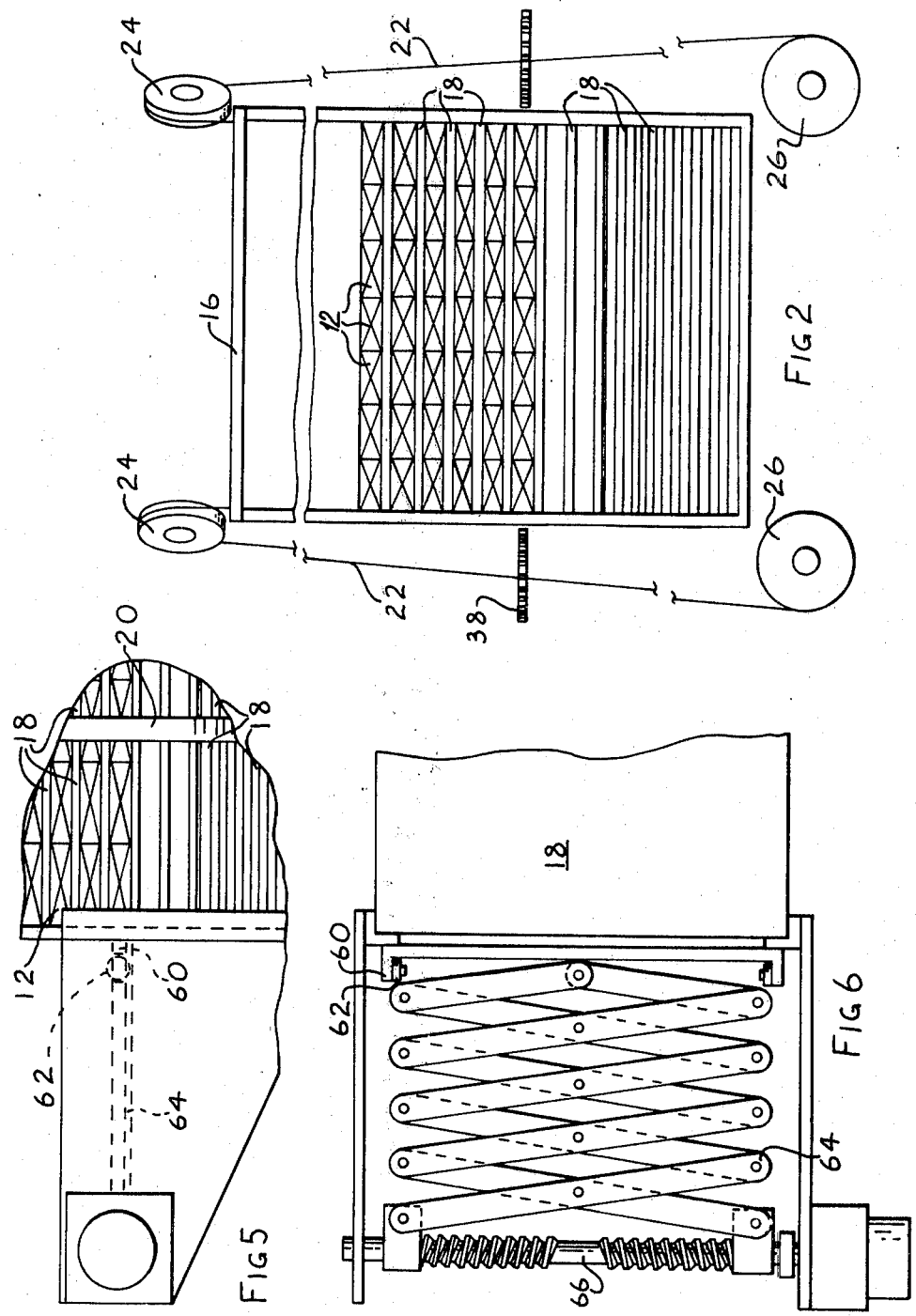

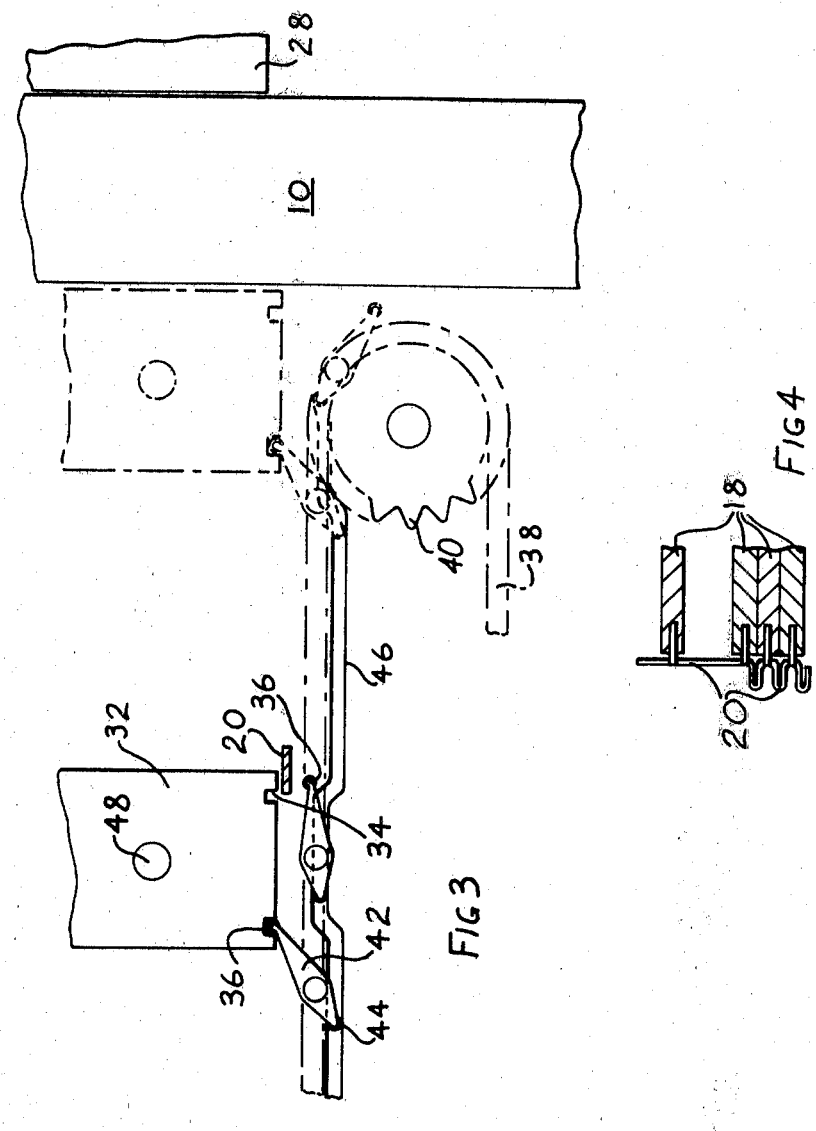

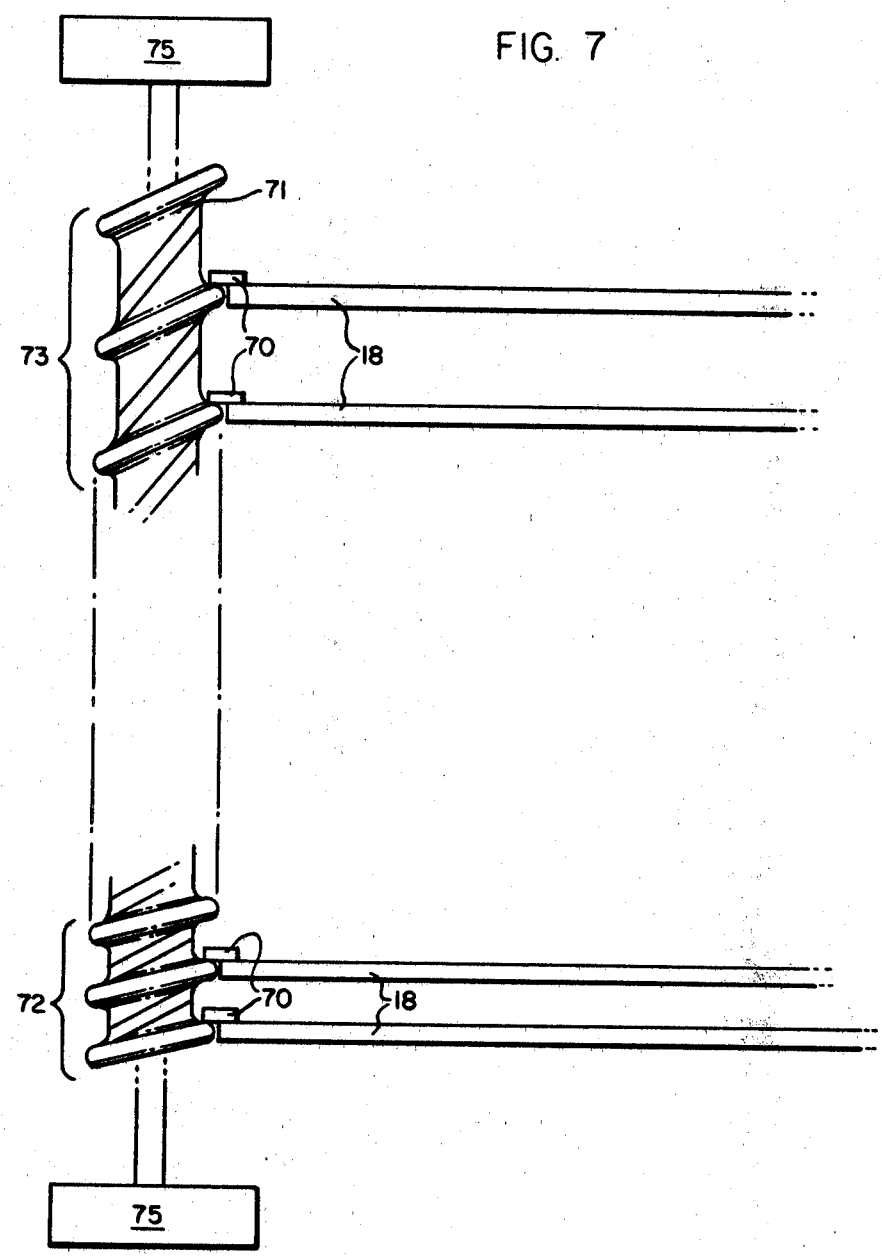

PACKET RESERVOIR

This invention is concerned with a reservoir for packets, especially cigarette packets.

In the cigarette industry it is sometimes desirable to transfer packets between machines or parts of a machine which are operable independently. For example, packets may be transferred from a cigarette packing machine to a packet wrapping machine. In order to allow one machine or part of a machine to continue to operate when the other machine or part is temporarily out of action a reservoir or accumulator for packets may be provided to supply or receive packets as required. If, for example, a reservoir is positioned between a cigarette packing machine and a packet wrapping machine it can, for a limited period, receive packets from the packing machine when the wrapper is not working or supply packets to the wrapping machine when the packing machine is not working.

According to the present invention a reservoir for packets comprises support means for packets and reversible conveying means for progressively moving said support means from a position at which said support means is compactly stored with adjacent portions closely spaced to a position at which said portions are spaced apart by a distance sufficient to receive packets between them.

In a preferred arrangement the adjacent portions comprise separate partitions, e.g. vertically-spaced substantially horizontal plates arranged to receive batches of packets transferred onto them in a substantially horizontal direction. The partitions may be compactly stored in a stack and the conveying means arranged to progressively and successively space apart partitions from the stack. The partitions may be connected to each other by flexible elements, such as tapes, in a manner similar to a venetian blind so that for loading they may be successively raised (or lowered) from a stack of plates in abutment. Conversely, after unloading the plates may be returned to the stack.

In an alternative embodiment the plates may be supported and moved by means of two or more screw-threaded substantially vertical shafts, the pitch of the threads of which change so that the plates are held close together on one part of the thread but are spaced apart on another part.

Preferably the reservoir is arranged to receive packets from a conveyor which moves packets in line, e.g. between a packing machine and a wrapping machine. The reservoir may include one plate at the level of the conveyor with a stack of empty plates in abutment below that level. In order to load the reservoir successive batches of packets in line may be swept off the conveyor onto the plate by a plunger. Each plate preferably receives a plurality of such batches in abutment so that, when full, it supports a rectangular array of packets. When the plate at the level of the conveyor is full (and assuming it is still required to load the reservoir) the full plate is raised for storage and the plate below it is raised to the level of the conveyor so that it may be filled.

For unloading of the reservoir a return member may be moved over a full plate at the level of the conveyor to move successive batches back onto the conveyor. The return member may be a plunger, operated for example by a retractable semi-flexible chain or scissors mechanism so that it can extend across the plate towards the conveyor to return batches thereto and subsequently be withdrawn rapidly prior to the next full plate being moved into position for similar unloading. Alternatively the reservoir may include a separate return member associated with each plate and driven across the plate for unloading by external drive means at the level of the conveyor. In this case the return chambers are preferably stored alongside the stacked plates after unloading and reinserted on the associated plate just prior to loading. The return member is then advanced onto the plate ahead of the batches of packets transferred onto it so that full plates stored in the reservoir include a return member on the side of the packets remote from the conveyor, so that each plate is ready for unloading.

In order to allow transfer from or onto the conveyor, means may be provided for temporarily arresting movement of packets on the conveyor. For example the conveyor may be moved continuously and have associated with it gate means immediately upstream and downstream of the transfer position to the reservoir so that packets may be halted on the conveyor upstream of the reservoir when it is required to return batches of packets from the reservoir to the conveyor and packets may be halted opposite the reservoir when it is required to transfer batches of packets into the reservoir. Gate means suitable for use with the conveyor are disclosed in British Pat. No. 2025347.

The arrangement of the present packet reservoir, which includes thin partitions stored close together or in abutment when not in use and maintained at a separation only just exceeding the height of a packet when being used to store packets allows a particularly effective use of space for storage of packets, thereby resulting in a compact unit relative to its capacity.

The invention will be further described, by way of example only, with reference to the accompanying diagrammatic drawings, in which:

FIG. 1 is a side view of a reservoir for packets of cigarettes;

FIG. 1a is a schematic view of a system in which the reservoir may be used;

FIG. 2 is a view on the line II—II of FIG. 1;

FIG. 3 is an enlarged horizontal sectional view of part of the reservoir of FIG. 1;

FIG. 4 is an enlarged vertical sectional view of another part of the reservoir of FIG. 1;

FIG. 5 is a side view of part of a modified reservoir for packets of cigarettes;

FIG. 6 is a plan view of the modified part of the reservoir of FIG. 5; and

FIG. 7 is a side view of part of a modified support arrangement for packets of cigarettes in the reservoir.

Referring to FIGS. 1, 1a and 2 an endless band conveyor 10 is arranged to carry packets 12 of cigarettes in line from a cigarette packing machine 1 to a cigarette wrapping machine 2. Associated with the conveyor 10 is a packet reservoir 14 operable to accept packets 12 from the conveyor, temporarily store packets, or return packets to the conveyor, generally according to the relative rates of supply of packets to and demand for packets from the conveyor as determined by operating conditions of the packing machine 1 and wrapping machine 2 respectively.

The reservoir 14 includes a storage structure 16 on one side of the conveyor 10, including a number of horizontal plates 18 connected together by spaced flexible tapes 20 on each side. Thus the plates 18 are connected in a manner similar to the slats of a venetian blind. The plates 18 are relatively thin, of the order of 2-3 mm for example, but are stiff so that sag under load will be minimal. Suitable material for the plates 18 would be anodised duralumin or carbon fibre filled plastics material, possibly with a honeycomb structure. As best seen in FIG. 2 the plates 18 have a width, along the direction of conveyance on conveyor 10, corresponding to seven packet lengths.

The tapes 20 on each side of the plates 18 are connected to a hawser line 22 which passes over angled pulleys 24 to a driven capstan 26. The tapes 20 may be raised or lowered by rotation of the capstans 24. The capstans 24 are always driven together so that the plates 18 remain horizontal. When the plates 18 are in their fully lowered positions they rest on top of one another with the lowermost plate resting on a platform or abutments at or near the bottom of the structure 16. The tapes 20 bend outwards between the plates 18 as indicated in FIG. 4; the tapes could be semi-flexible with residual slight resilience to ensure that they bend outwards when not under tension. The plates 18 may be successively raised from their lowermost position by movement of the hawser lines 22, successive plates being raised and spaced apart from the respective plate immediately below as the tapes 20 are progressively tensioned. The distance between the plates 18 when they are suspended from the tapes 20 just exceeds the height of a packet 12.

On the opposite side of the conveyor 10 to the store structure 16 is a plunger 28 which extends along the conveyor for a distance corresponding to the width of the plates 18, i.e. for seven packet lengths, and is intermittently operable to displace batches of seven packets 12 sideways off the conveyor and towards the plate at the same level. Between the conveyor 10 and the store structure 16 is a vertically movable platform 30 which normally supports a column of return carriage members 32. Each of the members 32 is associated with one plate 18 and extends for the width of the plates.

When an empty plate 18 is moved by the hawser lines 22 into position to receive packets 12 from the plunger 28 the platform 30 is raised by the height of a return member 32, thereby moving the uppermost member 32 into the path of the plunger. A full stroke of the plunger 28 during loading causes a batch of seven packets 12 first to be moved against said uppermost member 32 and move said member onto the plate 18, and subsequently to move the batch of packets over the member 32 which was previously below said uppermost member and onto the plate 18. Successive operations of the plunger 28 cause successive batches delivered by the conveyor 10 to be moved sideways in a similar manner, each successive operation advancing all the previously removed batches and the member 32 on the plate 18. When the plate 18 is full to capacity, with the return member 32 at the end of its travel on the plate (and possibly operating a sensor to record that the plate is full) and a plurality of batches in abutment, and assuming it is still required to load the reservoir 14, the capstans 24 are operated to draw the lines 22 upwards by the spacing between plates 18 so that the next plate is lifted to the level of the conveyor 10, the plate just loaded being lifted to a position above it for storage. At the same time the platform 30 is lifted to move the next return member 32 into the path of the plunger 28 for advancement onto the next empty plate 18.

As described, the plunger 28 has a stroke which extends over the conveyor 10 and the stack of members 32. Although it is necessary for the stroke to be of this length at the last filling operation on a plate 18 (so that a gap is created to allow entry of the next return member 32 into the path of the plunger), the stroke could be shorter for intermediate plunges, leaving a batch of packets resting on the stack of members 32. Sensor means detecting the state of fill of the plate 18 could readily indicate when the last plunge to completely fill the plate is required and control means could be provided to increase the plunger stroke accordingly.

As a result of the loading operation described above, each plate 18 supporting packets 12 has a return carriage member 32 located on the opposite side of the packets to the conveyor 10. As previously noted the members 32 extend for the width of the plates 18 and are in abutment with the first batches of packets 12 advanced onto the respective plates. The members 32 are drivable towards the conveyor 10 in order to return packets 12 to the conveyor during unloading of the reservoir 14. For this purpose, as shown in FIG. 3, each member is formed with a pair of recesses 34 at each end. The recesses 34 are normally engaged by pairs of drive pins 36 carried by drive chains 38 positioned on each side of the store structure 16 just above the level of the conveyor 10. The chains 38 pass around sprockets 40 and are intermittently driven, as required, to move the pins 36, and therefore the return member 32, along the plate 18 and so move the packets on the plate towards the conveyor 10.

In order to avoid fouling the tapes 20 supporting the plates 18 each pin 36 is carried at one end of a link 42 which is centrally pivotally attached to the chain 38 and which carried at its other end a cam follower 44 movable along a cam track 46. As shown in FIG. 3 the link 42 is pivoted by virtue of engagement of the follower 44 in the cam track 46 as the link passes a tape 20.

The members 32 have holes 48 (FIG. 3) near each end which engage with storage posts 50 (FIG. 1) in the store structure 16 when a full plate 18 is lifted away from the level of the conveyor 10. It should be noted that the posts 50 end above this level so that the member 32 is free to be moved by the drive pins 36. In order to avoid delays in operation when unloading of successive plates 18 is required each chain 18 may carry more than one set of drive pins 36 so that after the member 32 on a plate which has been unloaded has reached the position shown in chain-dot lines in FIG. 3 another set is in position to engage with the recesses 34 of the member 32 which is released from the posts 50 when the hawser lines 22 lower the next full plate 18.

Each batch of packets 12 is returned to the conveyor 10 over the column of members 32 on the platform 30 (or in the case of the lowermost plate 18 over the platform 30 itself). In order to aid transfer to the conveyor 10 (which normally will be moving continuously) the plunger 28 is advanced over the conveyor 10 together with a series of overhead suction devices 52 carried at the ends of arms 54 operable by an air cylinder 56. The suction devices 52 are spaced along the length of the plunger 28 so that there is one device for each packet 12 in a batch (i.e. seven). After the plunger 28 has advanced across the conveyor 10 so that the suction devices 52 are above the platform 30. The cylinder 56 is operated so that the arm 54 is tilted slightly to lower the devices 52 which then pick-up the packets 12 in the batch in that position. Subsequently the plunger 28 is retracted and the batch of packets is released when the suction devices are above the conveyor 10. The use of the devices 52 avoids pushing the packets 12 transversely onto the moving conveyor 10. However, the return members 32 could be used without the use of the devices 52 (so that the plunger 28 need not be operated during unloading of the reservoir 14).

When all the batches of packets 12 have been transferred from a plate 18 the return member 32 is deposited on top of the column of other such members 32 on the platform 30. If unloading is to continue so that another full plate 18 is brought down for unloading, the platform 30 is lowered by the height of one member 32 to bring the top surface of the column of members to the same level as the conveyor 10.

During loading of packets the drive pins 36 will be engaged with the recesses 34 of the members 32 and are preferably driven in synchronism with the operation of the plunger 28. This takes at least some of the load off the packets 12 as they are pushed onto the plate 18.

It will be noted that the stroke of the plunger 28 during loading is approximately twice that required during unloading. The suction device assembly 52, 54, 56 is carried by the plunger 28 by means of a lost-motion spring-loaded mechanism which cooperates with a fixed stop so that the assembly 52, 54, 56 does not pass beyond the positive above the platform 30 during the loading stroke.

As noted above, the conveyor 10 is normally driven continuously to move packets 12 from the packing machine to the wrapping machine (although it could move packets intermittently and be stopped during loading and unloading of the reservoir 14). In order to hold up packets on a moving conveyor 10 the plunger 28 is L-shaped having a section 58 which extends across the conveyor 10 on the upstream side when the plunger is advanced.

A series of sensors may be provided along the conveyor 10 to monitor conditions both upstream and downstream of the reservoir 14 and, in particular, to ensure that the plunger 28 is only allowed to operate when appropriate conditions prevail on the conveyor, e.g. when there is a full batch of packets in its path for loading or when there are no packets in its path for unloading. It is preferable to arrange for packets 12 on the conveyor 10 to be controlled by use of gates which, for example, ensure that ful batches of packets are transferred into the reservoir 14 and that there is a gap in the packets on the conveyor 10, when required, to allow transfer of packets to the conveyor. Further details of gates and sensors which can be used with the present arrangement to control movement of packets 12 on the conveyor 10 may be obtained by reference to British Pat. No. 2025347, the disclosure of which is hereby incorporated herein in full. Other sensors which may be required are those for indicating that a plate 18 is full or empty and those for indicating that the reservoir 14 is at or is approaching the full or empty condition.

Instead of using a continuous chain 38 on each side of the store structure 16 separate drive chains and pins may be used on opposite sides of each of the tapes 20 and arranged to engage the recesses in the return member 32 so that for a short distance in the region of the tape 20 the member 32 is driven from chains on both sides of the tape 20.

Part of a modified reservoir is shown in FIGS. 5 and 6, in which return of packets 12 to the conveyor 10 is achieved by a return pusher 60 having rollers 62 for moving along the plate 18 at the level of the conveyor 10. The pusher 60 is operated by a scissors mechanism 64 carried by a driven threaded shaft 66. The pusher 60 is intermittently advanced to return batches of packets 12 to the conveyor 10 and, when the plate 18 is empty, is quickly withdrawn ready for unloading from the next plate. Instead of the mechanism 64 a non-collapsing semi-flexible elongate member such as a chain constrained to hinge only in one direction and operated by a driven sprocket could be used.

Instead of supporting the plates 18 by tapes 20 similar to a venetian blind, as seen FIG. 7, the plates 18 could carry lugs 70 (shown secured at the top of the plate as an example, but capable of other arrangements with the plate) for engagement with helically threaded rotatable vertical shafts 71 which lie alongside the plates 18 and support them, each shaft 71 being supported between elements 75 which comprise a bearing and a drive arrangement, respectively. The pitch of the threads below the level of the packet conveyor would be small, as seen at 72 so that the empty plates can be held on the threads in close proximity to one another but above that level, as seen at 73, the thread pitch is increased to move the plates apart to receive and store packets. Movement of the plates 18 is achieved by rotation of the shafts 71.

If required the full plates could be stored below the level of the packet conveyor and the empty plates above it. In other words the reservoir could effectively be inverted.

Typically a store structure 16 could be 450 mm wide and 1500 mm long, giving a capacity of over 1,000 packets for each 300 mm of height above the conveyor level.

We claim:

1. In a conveying system for conveying articles of the tobacco industry including a delivery station, a receiving station, and conveyor means for moving such articles in line on a path between said stations, an article reservoir arranged adjacent said path to provide a temporary buffer store for said articles on said path, said reservoir including support means having a plurality of substantially-vertically disposed portions for supporting said articles, reversible conveying means for progressively and reversibly moving said support means between a position at which said support means is compactly stored with adjacent portions closely spaced and a position at which said portions are spaced apart by a distance sufficient to receive and store said articles between them, means for selectively transferring articles from said path onto said support means, and means for returning articles from said support means onto said path, said transferring means and said returning means being positioned adjacent said path for operating on successive portions of said support means as they are moved past said position.

2. A packet reservoir as claimed in claim 1, wherein said adjacent portions comprise separate partitions.

3. A packet reservoir as claimed in claim 2, wherein said partitions are compactly stored in a stack and said conveying means includes means for progressively and successively spacing apart partitions from said stack.

4. A packet reservoir as claimed in claim 2, wherein said conveying means includes means connecting adjacent partitions.

5. A packet reservoir as claimed in claim 4, wherein said connecting means comprises flexible elements which allow variable spacing between said partitions.

6. A packet reservoir as claimed in claim 2, wherein said conveying means includes rotatable drive means including a screw thread having a first pitch for determining the spacing between partitions in said stored position and a second pitch for determining the spacing between partitions in said spaced apart position.

7. A packet reservoir as claimed in claim 1, wherein the adjacent portions comprise vertically-spaced platforms.

8. A packet reservoir as claimed in claim 7, including means for transferring a batch of packets transversely onto a platform.

9. A packet reservoir as claimed in claim 8, wherein said platform is of a size to receive a plurality of batches comprising lines of packets from said path.

10. A packet reservoir as claimed in claim 2, wherein said returning means includes unloading pusher means for projecting a member along a path extending at least partly between adjacent partitions to remove packets therefrom.

11. A packet reservoir as claimed in claim 10, wherein each partition is associated with a relatively movable member, which members form part of said pusher means along with common drive means for each member.

12. A packet reservoir as claimed in claim 10, wherein the pusher means includes a retractable element extendable for a substantial distance between said partitions.

13. A packet reservoir as claimed in claim 1, wherein said transferring means and said returning means are substantially opposed, so that packets are transferred to and returned from said support means in opposite directions at substantially the same position.

14. A packet reservoir as claimed in claim 1 or claim 13, wherein said transferring means and said returning means are arranged so that packets are transferred from and returned to substantially the same portion of said path.

* * * * *